United States Patent
Lim et al.

(10) Patent No.: US 10,115,938 B2
(45) Date of Patent: Oct. 30, 2018

(54) BATTERY CASE HAVING ANTI-WRINKLE PATTERN

(71) Applicant: LG CHEM, LTD., Seoul (KR)

(72) Inventors: Hae Jin Lim, Daejeon (KR); Jung Koo Kang, Daejeon (KR); Seong Min Kim, Daejeon (KR); Ju Bin Kim, Daejeon (KR); Joo Hwan Sung, Daejeon (KR); Seunghe Woo, Daejeon (KR); Sung Pil Yoon, Daejeon (KR); Jin Soo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 190 days.

(21) Appl. No.: 14/935,554

(22) Filed: Nov. 9, 2015

(65) Prior Publication Data

US 2016/0079576 A1    Mar. 17, 2016

Related U.S. Application Data

(63) Continuation of application No. PCT/KR2015/009293, filed on Sep. 3, 2015.

(30) Foreign Application Priority Data

Sep. 17, 2014  (KR) ........................ 10-2014-0123643

(51) Int. Cl.
*H01M 2/04* (2006.01)
*H01M 2/02* (2006.01)
(Continued)

(52) U.S. Cl.
CPC ....... *H01M 2/0292* (2013.01); *H01M 2/0217* (2013.01); *H01M 2/0275* (2013.01);
(Continued)

(58) Field of Classification Search
CPC ............ H01M 2/0292; H01M 2/1061; H01M 2/0275; H01M 2/0217; H01M 2/0287; H01M 10/052
See application file for complete search history.

(56) References Cited

U.S. PATENT DOCUMENTS

| | | | |
|---|---|---|---|
| 2006/0093905 A1* | 5/2006 | Kim | H01M 2/021 429/175 |
| 2012/0107657 A1 | 5/2012 | Kwon et al. | |

(Continued)

FOREIGN PATENT DOCUMENTS

| | | |
|---|---|---|
| EP | 3 096 386 A1 | 11/2016 |
| JP | 2001-57179 A | 2/2001 |

(Continued)

OTHER PUBLICATIONS

Supplementary European Search Report dated Oct. 25, 2017 in EP Application No. 15842989.4.

*Primary Examiner* — Jimmy Vo
(74) *Attorney, Agent, or Firm* — Birch, Stewart, Kolasch & Birch, LLP

(57) ABSTRACT

Disclosed herein is a battery case made of a laminate sheet including an outer coating layer made of a weather-resistant polymer, an inner sealant layer made of a thermally bondable polymer, and a barrier layer interposed between the outer coating layer and the inner sealant layer, wherein an electrode assembly configured to be bent or curved in conformity with the shape of a device, in which a battery cell is mounted, is received in the battery case, and a pattern is formed on at least one surface of the battery case that faces an outer surface of the electrode assembly.

18 Claims, 6 Drawing Sheets

(51) Int. Cl.
 *H01M 10/052* (2010.01)
 *H01M 2/10* (2006.01)
(52) U.S. Cl.
 CPC ....... *H01M 2/0287* (2013.01); *H01M 2/1061* (2013.01); *H01M 10/052* (2013.01)

(56) References Cited

U.S. PATENT DOCUMENTS

2012/0183706 A1* 7/2012 Kang .................. H01M 2/0275
 428/29
2013/0252081 A1 9/2013 Kim et al.

FOREIGN PATENT DOCUMENTS

| | | |
|---|---|---|
| JP | 2003-123706 A | 4/2003 |
| JP | 2004-39271 A | 2/2004 |
| JP | 2011-253763 A | 12/2011 |
| JP | 2013-543643 A | 12/2013 |
| KR | 10-2014-0013266 A | 2/2014 |
| KR | 10-2014-0070751 A | 6/2014 |

* cited by examiner

[FIG. 1]
Prior Art
10
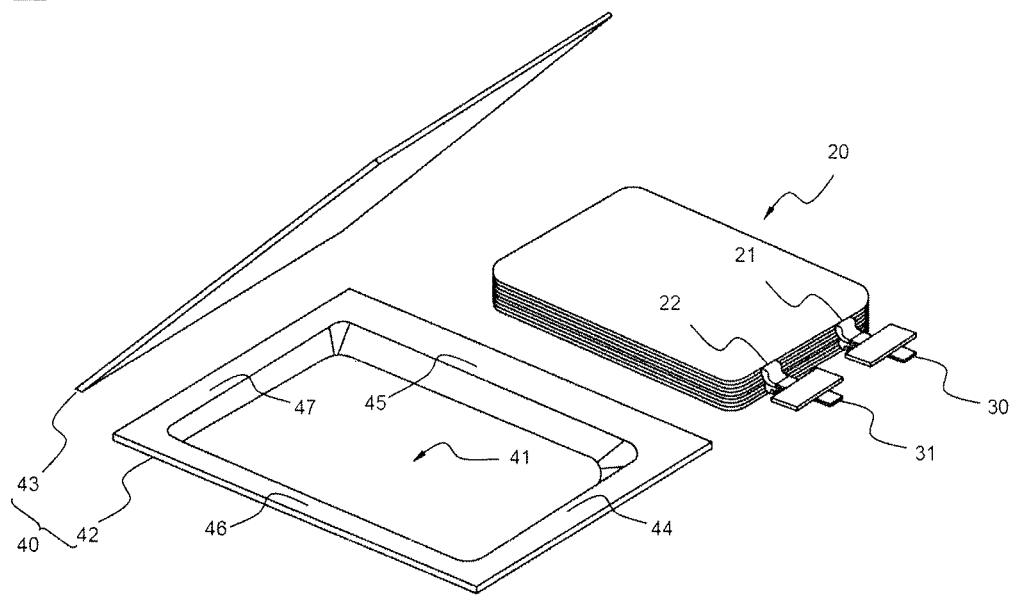
[FIG. 2]
Prior Art
10
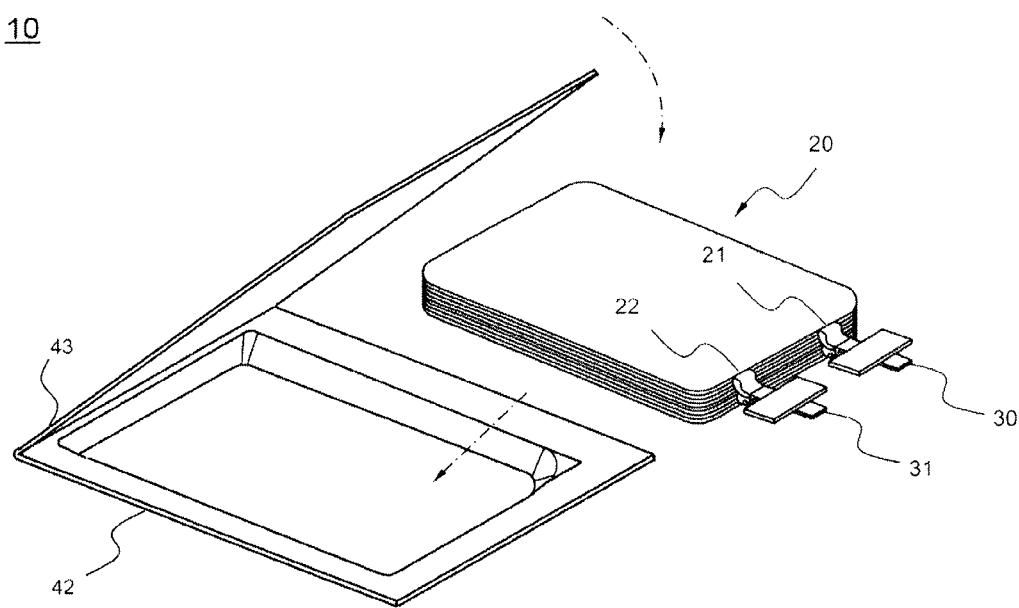

[FIG. 3]
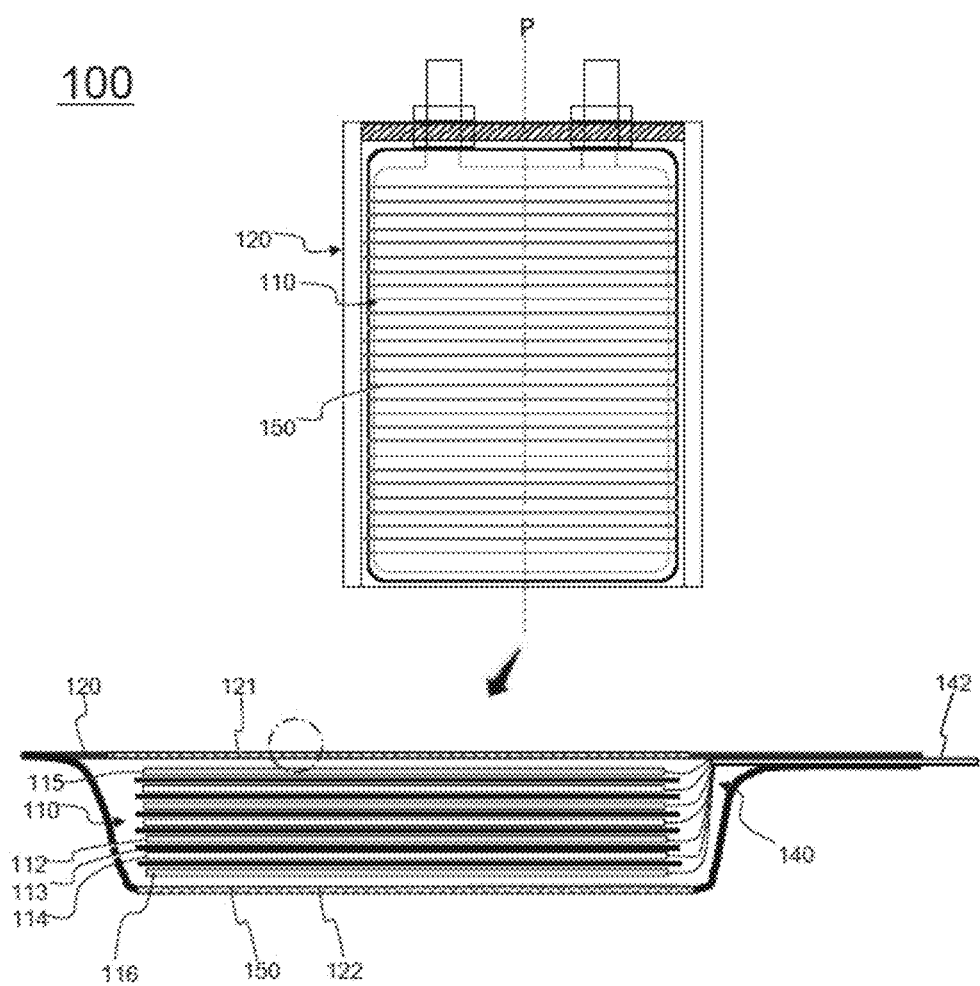

[FIG. 4]
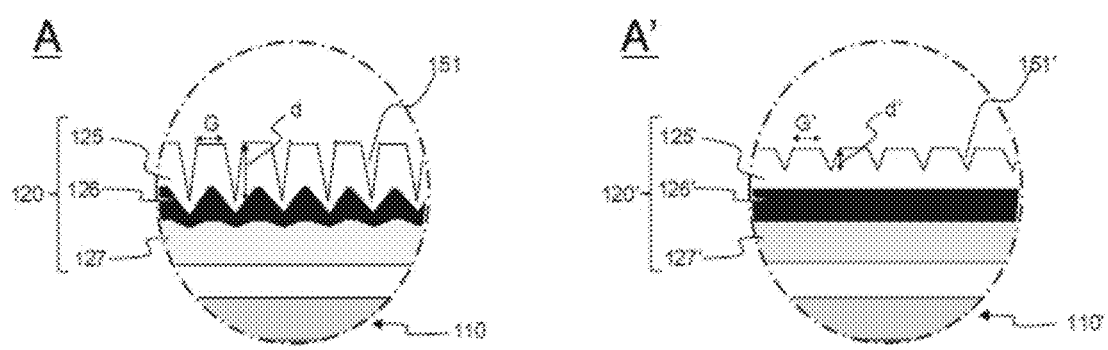

[FIG. 5]
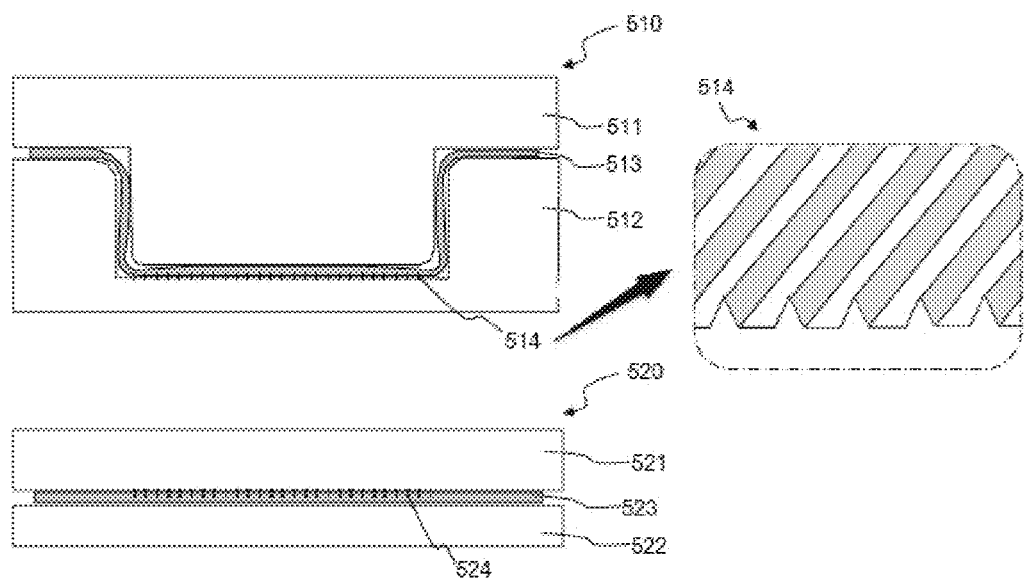
[FIG. 6]
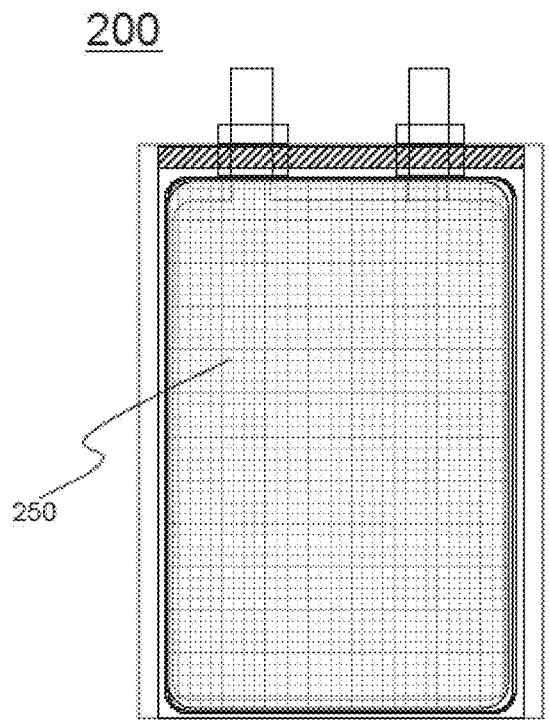

[FIG. 7]
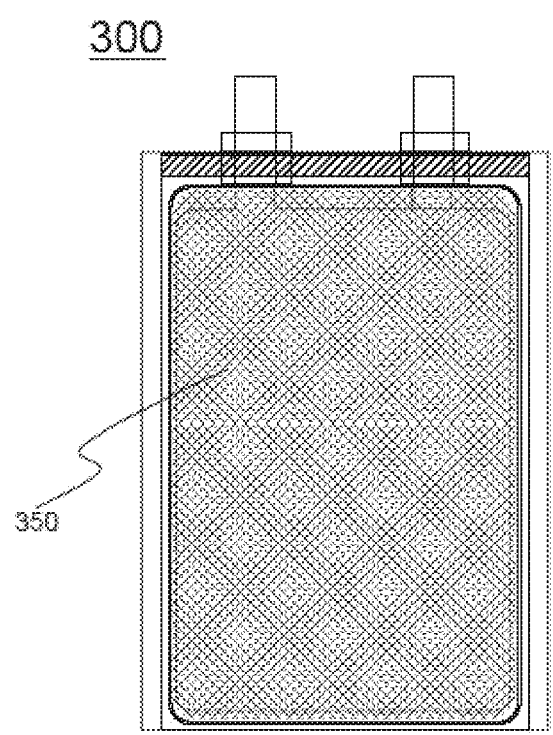

[FIG. 8]
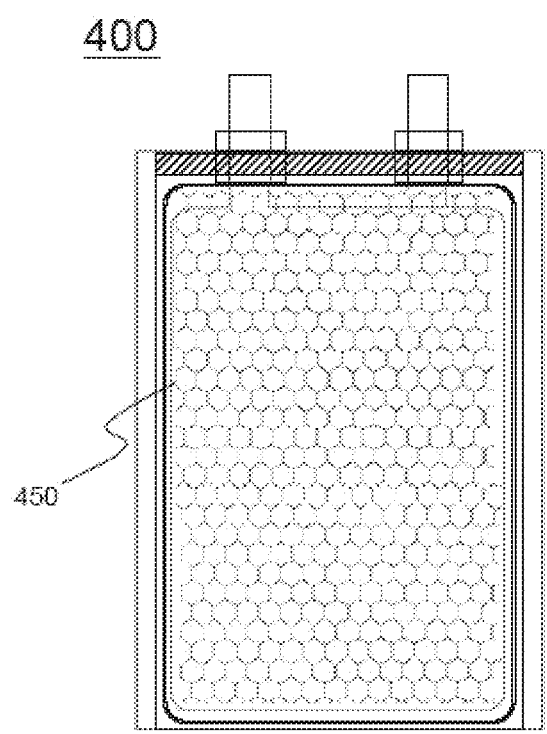

BATTERY CASE HAVING ANTI-WRINKLE PATTERN

CROSS REFERENCE TO RELATED APPLICATIONS

This application is a Continuation of PCT International Application No. PCT/KR2015/009293 filed on Sep. 3, 2015, which claims priority under 35 U.S.C. § 119(a) to Korean Patent Application No. 10-2014-0123643 filed on Sep. 17, 2014, all of which are hereby expressly incorporated by reference into the present application.

TECHNICAL FIELD

The present invention relates to a battery case having an anti-wrinkle pattern.

BACKGROUND ART

With the remarkable development of Information Technology (IT), a great result, in the $21^{st}$ century, we are moving toward the era of ubiquity, in which high variety of portable information communication devices has been popularized. As a -quality information service is possible regardless of time and place.

Lithium secondary batteries are very important in realizing the ubiquitous era. Specifically, lithium secondary batteries, which can be charged and discharged, have been widely used as an energy source for wireless mobile devices. In addition, the secondary batteries have also been used as an energy source for electric vehicles and hybrid electric vehicles, which have been proposed to solve problems, such as air pollution, caused by existing gasoline and diesel vehicles that use fossil fuel.

With the diversification of devices, to which the lithium secondary batteries are applicable, as described above, the lithium secondary batteries have also been diversified such that the secondary batteries can provide outputs and capacities suitable for devices to which the lithium secondary batteries are applied. In addition, there is a strong need to reduce the size and weight of the lithium secondary batteries.

The lithium secondary batteries may be classified based on the shape thereof into a cylindrical battery cell, a prismatic battery cell, and a pouch-shaped battery cell. Among these kinds of lithium secondary batteries, much interest is currently focused on the pouch-shaped battery cell, which can be stacked with high integration, has high energy density per unit volume, can be manufactured at low cost, and can be easily modified.

FIGS. 1 and 2 are exploded perspective views typically showing a general structure of a conventional representative pouch-shaped secondary battery.

Referring to FIG. 1, a pouch-shaped secondary battery 10 includes a stacked type electrode assembly 20 having pluralities of electrode tabs 21 and 22 extending therefrom, two electrode leads 30 and 31 connected respectively to the electrode tabs 21 and 22, and a battery case 40, in which the electrode assembly 20 is received in a sealed state such that the electrode leads 30 and 31 are partially exposed outward from the battery case 40.

The battery case 40 includes a lower case 42 having a concave receiving part 41, in which the stacked type electrode assembly 20 is located, and an upper case 43 for covering the lower case 42 such that the stacked type electrode assembly 20 is sealed in the battery case 40. The upper case 43 and the lower case 42 are connected to each other by thermal bonding in a state in which the electrode assembly 20 is mounted therein to form an upper end sealed portion 44, side sealed portions 45 and 46, and a lower end sealed portion 47.

As shown in FIG. 1, the upper case 43 and the lower case 42 may be configured as separate members. As shown in FIG. 2, on the other hand, one end of the upper case 43 may be integrally formed at a corresponding end of the lower case 42 such that the upper case 43 and the lower case 42 may be hingedly connected to each other.

In addition, as shown in FIGS. 1 and 2, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above-described method.

Meanwhile, FIGS. 1 and 2 show the pouch-shaped battery cell having the stacked type electrode assembly. Alternatively, a pouch-shaped battery cell having a wound type or jelly-roll type electrode assembly may also be manufactured using the above-described method.

As shown in FIGS. 1 and 2, the pouch-shaped battery cell is generally configured to have an approximately rectangular hexahedral shape.

However, devices, to which the pouch-shaped battery cell is applied, may be configured to have various shapes other than a rectangular hexahedral shape. The devices may even be configured to have a curved shape. For example, sides of a smart phone may be curved so as to be easier to grip, and a flexible display device may be curved or bent. That is, the flexible display device may be manufactured to have various shapes.

In a case in which a battery cell or a battery pack configured to have a rectangular hexahedral shape is mounted in a device designed so as to have such curved parts or a device that can be curved, however, the efficiency of utilization of the space in the device may be lowered. In recent years, it has been required for the battery cell to be flexible such that the battery cell can be easily mounted in devices configured to have various kinds of designs.

Therefore, there is a high necessity for technology that is capable of preventing unintentional wrinkles from being formed on a sheathing member of a battery cell even when the battery cell is deformed, thereby improving the safety of the battery cell.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in a case in which a battery cell is manufactured using a battery case having patterns formed at surfaces thereof that face the outer surface of an electrode assembly, as will hereinafter be described, it is possible to prevent unintentional wrinkles from being formed on the battery case even when the battery cell is deformed, thereby improving the safety of the battery cell. The present invention has been completed based on these findings.

Technical Solution

In accordance with one aspect of the present invention, the above and other objects can be accomplished by the provision of a battery case made of a laminate sheet including an outer coating layer made of a weather-resistant polymer, an inner sealant layer made of a thermally bondable polymer, and a barrier layer interposed between the outer coating layer and the inner sealant layer, wherein an electrode assembly configured to be bent or curved in conformity with the shape of a device, in which a battery cell is mounted, is received in the battery case, and a pattern is formed on at least one surface of the battery case that faces the outer surface of the electrode assembly.

In general, when a battery cell is bent or curved, unintentional wrinkles may be formed on a portion of the surface of a battery case of the battery cell that contacts an electrode assembly, or the portion of the battery case may be folded. The wrinkles or the folded portion may be easily worn as the result of the battery cell being repeatedly deformed. Eventually, the battery case may be damaged with the result that an electrolyte may leak from the battery case, or the battery case may lose an insulating function thereof.

In the battery cell according to the present invention, however, the patterns are formed on the surfaces of the battery case that face the outer surface of the electrode assembly. When the battery cell is deformed, therefore, the battery case may be easily bent or curved along the patterns. Consequently, it is possible to prevent unintentional wrinkles from being formed on the battery case or to prevent the battery case from being folded, thereby improving the safety of the battery cell.

In a concrete example, the battery case may include an upper case that faces the upper surface of the electrode assembly and a lower case that faces the lower surface of the electrode assembly. In this case, the pattern may be formed on the surface of the upper case or the lower case corresponding to the outer surface of the electrode assembly at a position thereof adjacent to the surface of the electrode assembly that is bent or curved such that, when the battery cell is bent or curved, the battery case can also be easily bent or curved. Furthermore, the pattern may be formed on a case surface of the upper case corresponding to the upper surface of the electrode assembly and on a case surface of the lower case corresponding to the lower surface of the electrode assembly such that the battery case can be bent or curved in both directions.

In this specification, the term 'pattern' means a specific repeating shape formed on the battery case when viewed from above.

The pattern is not particularly restricted so long as the battery case is configured to be flexibly deformed in a longitudinal direction, a lateral direction, or an oblique direction thereof when the electrode assembly is bent or curved. For example, the pattern may have a striped structure, a honeycomb structure, a lattice structure, or a continuous diamond structure when the battery case is viewed from above.

The pattern may be formed through a forming process of the battery case, or may be formed through an additional pressing process after the forming process. Specifically, the pattern may be formed using a deep drawing jig, which is used in the forming process of the battery case, and/or an additional pressing jig.

The forming process includes a deep drawing process of forming a space, in which the electrode assembly is received, at the upper case and the lower case. In a case in which the receiving space is formed only at the lower case, the forming process may also include a process of forming the upper case such that the upper case corresponds in size to the lower case.

Specifically, in order to form the pattern during the forming process, a lower jig for deep drawing that is configured to have a concave and convex structure based on a desired pattern may be used when deep drawing is carried out to manufacture the upper and/or lower case having the space for receiving the electrode assembly. In a case in which the receiving space is formed only at the lower case, an additional pressing jig that is configured to have a concave and convex structure based on a desired pattern may be used during the process of forming the upper case such that the upper case corresponds in size to the lower case. In order to form the pattern after the deep drawing process, on the other hand, an additional pressing jig that is configured to have a concave and convex structure necessary to form the pattern may be used to form the pattern on each of the upper and lower cases having been formed through the forming process.

That is, the pattern may be formed using the jig having the concave and convex structure as described above. For example, the pattern may include a plurality of grooves formed at the battery case such that the grooves are concave in a direction in which the electrode assembly is mounted in the battery case.

The range within which the grooves are formed and the depth of the grooves may differ depending upon the pressure applied from the jig to the battery case and the depth to which the jig presses the battery case. Specifically, the grooves may be formed at all of the outer coating layer, the barrier layer, and the inner sealant layer of the battery case. Alternatively, the grooves may be formed only at the outer coating layer in order to prevent the reduction in sealing force of the battery case, the exposure of the barrier layer, or the reduction in strength of the barrier layer.

Of course, in a case in which the grooves are formed at all of the outer coating layer, the barrier layer, and the inner sealant layer of the battery case, all of the layers of the battery case are deformed in conformity with the shape of the grooves such that the depth of the grooves gradually decreases from the outer coating layer to the inner sealant layer in order to prevent the battery layer from being exposed. The shape of the grooves will hereinafter be described in detail with reference to FIG. 4.

The depth of the grooves formed as described above may be defined as the depth of the grooves formed at the outer coating layer. It is obvious that the depth of the grooves when formed at all of the outer coating layer, the barrier layer, and the inner sealant layer of the battery case is greater than the depth of the grooves when formed only at the outer coating layer of the battery case. Specifically, in a case in which the grooves are formed at all of the outer coating layer, the barrier layer, and the inner sealant layer of the battery case, each of the grooves may have a depth equivalent to 30% to 70% of the total thickness of the battery case. In a case in which the grooves are formed only at the outer coating layer of the battery case, each of the grooves may have a depth equivalent to 30% to 70% of the thickness of the outer coating layer.

The range within which the grooves are formed and the depth of the grooves may be appropriately set based on the purpose of a device in which the battery cell is mounted. Specifically, in a case in which the depth of the grooves is large, a possibility that the sealing force of the battery case will be reduced, the barrier layer will be exposed, or the strength of the barrier layer will be reduced may increase, whereas the battery case may be easily bent or curved without wrinkles being formed on the battery case. Consequently, the large depth of the grooves is suitable for a device that is greatly bent or curved. On the other hand, in a case in which the depth of the grooves is small, the battery case may not be easily bent or curved, whereas the battery case exhibits high safety. Consequently, the small depth of the grooves is suitable for a device in which safety is critical.

In a case in which the depth of the grooves is less than 30% of the total thickness of the battery case or the thickness of the outer coating layer, it is difficult to achieve an anti-wrinkle effect according to the present invention, which is not desirable. On the other hand, in a case in which the depth of the grooves is greater than 70% of the total thickness of the battery case or the thickness of the outer coating layer, there is an increased possibility that the sealing force of the battery case will be reduced, the barrier layer will be exposed, or the strength of the barrier layer will be reduced, with the result that the safety of the battery cell may be reduced, which is not desirable either.

The interval between the grooves is the shortest distance between neighboring ones of the grooves formed in the same direction. The interval between the grooves may be set to be suitable for device in which the battery cell is mounted. In a case in which the battery cell is greatly deformed, the interval between the grooves may be small. On the other hand, in a case in which the battery cell is only slightly deformed, the interval between the grooves may be large in order to improve the sealability and safety of the battery cell. In a concrete example, the grooves may be arranged at an interval of 2 mm to 15 mm.

In a case in which the pattern having the above-described structure is formed on the surfaces of the battery case that face the outer surface of the electrode assembly, the outer surface of the battery case has an appropriate amount of extra area. Consequently, the battery case may be flexibly deformed in conformity with the shape of the electrode that is bent or curved, whereby it is possible to minimize wrinkles from being formed on the remaining region of the battery case other than the grooves constituting the pattern on the battery case.

In a concrete example, the area of the surface of the battery case within which the pattern is formed may be equivalent to 50 to 100% of the entire area of the surface of the battery case when the battery case is viewed from above. In a case in which the area of the surface of the battery case within which the pattern is formed is not 100% of the entire area of the surface of the battery case, the pattern may be formed on a region of the battery case that is bent, i.e. at which many wrinkles are formed, but the position of the pattern on the surface of the battery case is not particularly restricted. For example, the pattern may be formed at a region of the battery case that includes a vertical axis passing through the middle of the electrode assembly.

In a case in which the area of the surface of the battery case within which the pattern is formed is less than 50% of the entire area of the surface of the battery case, it is not possible to effectively achieve the anti-wrinkle effect according to the present invention, which is not desirable.

In order to achieve the above-mentioned effect, including the pattern as described above, a case having high deformability and high stretchability may be used as the battery case according to the present invention. As described above, the battery case may be a pouch-shaped battery case made of a laminate sheet including an outer coating layer made of a weather-resistant polymer, an inner sealant layer made of a thermally bondable polymer, and a barrier layer interposed between the outer coating layer and the inner sealant layer.

The barrier layer may function to increase the strength of the battery case in addition to functioning to prevent the introduction or leakage of foreign matter, such as gas or moisture. To this end, in a concrete example, the barrier layer may be a metal layer made of any one selected from a group consisting of aluminum, iron, copper, tin, nickel, cobalt, silver, stainless steel, and titanium or an alloy thereof.

It is necessary for the outer coating layer to exhibit high resistance to the external environment. To this end, the outer coating layer may be made of a weather-resistant polymer that exhibits high tensile strength and weather resistance. The weather-resistant polymer may be polyethylene terephthalate (PET), polyethylene naphthalate (PEN), or nylon.

The inner sealant layer may be made of a thermally bondable polymer that exhibits high thermal bondability (thermal adhesiveness), exhibits a sufficiently low hygroscopic property to restrain the penetration of an electrolyte, and is not expanded or corroded by the electrolyte. The thermally bondable polymer may be polyolefin. Specifically, the thermally bondable polymer may be cast polypropylene (CPP).

In accordance with another aspect of the present invention, there is provided a battery cell including a battery case with the above-stated construction, an electrode assembly configured to be bent or curved in conformity with the shape of a device, in which the battery cell is mounted, and an electrolyte. The battery cell is not particularly restricted. For example, the battery cell may be a well-known lithium secondary battery having an electrode assembly impregnated with an electrolytic solution containing lithium salt.

The electrode assembly is mounted in the battery case in a state in which the electrode assembly is impregnated with an electrolytic solution. The kind of the electrode assembly is not particularly restricted. For example, the electrode assembly may be configured to have a jelly-roll type structure in which a long sheet type positive electrode and a long sheet type negative electrode are wound in a state in which a separator is disposed between the positive electrode and the negative electrode, a stacked type structure in which pluralities of positive electrodes and negative electrodes each having a predetermined size are sequentially stacked in a state in which separators are disposed respectively between the positive electrodes and the negative electrodes, a stacked/folded type structure in which predetermined numbers of positive electrodes and negative electrodes are sequentially stacked in a state in which separators are disposed respectively between the positive electrodes and the negative electrodes to constitute a bi-cell or a full cell, and then a plurality of bi-cells or full cells is folded using a separation film, or a laminated/stacked type structure in which bi-cells or full cells are stacked in a state in which separators are disposed respectively between the bi-cells or the full cells.

Each of the bi-cells may be configured to have a structure in which a first electrode, a separator, a second electrode, a separator, and a first electrode are sequentially stacked. Each of the full cells may be configured to have a structure in which a first electrode, a separator, and a second electrode are sequentially stacked.

The first electrode and the second electrode have opposite polarities. For example, the first electrode may be a positive electrode or a negative electrode. In this case, the second electrode may be a negative electrode or a positive electrode.

In accordance with other aspects of the present invention, there are provided a battery pack including the battery cell as a unit cell and a device including the battery pack as a power source.

For example, the device may be any one selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIGS. 1 and 2 are exploded perspective views showing a conventional representative pouch-shaped secondary battery;

FIG. 3 is a plan view and a vertical sectional view showing a battery cell according to an embodiment of the present invention;

FIG. 4 is enlarged typical views showing a part indicated by a circle in FIG. 3;

FIG. 5 is a typical view and an enlarged perspective view showing jigs that are used to manufacture a battery case of FIG. 3;

FIG. 6 is a plan view showing a battery cell having another pattern according to the present invention;

FIG. 7 is a plan view showing a battery cell having yet another pattern according to the present invention; and FIG. 8 is a plan view showing a battery cell having a further pattern according to the present invention.

BEST MODE

Now, exemplary embodiments of the present invention will be described in detail with reference to the accompanying drawings. It should be noted, however, that the scope of the present invention is not limited by the illustrated embodiments.

FIG. 3 is a plan view typically showing a battery cell 100 according to an embodiment of the present invention and a vertical sectional view taken along line P, and FIG. 4 is enlarged typical views A and A' showing a part of the battery cell on which a pattern is formed (a part indicated by a dotted-line circle) in FIG. 3.

Referring first to FIG. 3, the battery cell 100 is configured to have a structure in which an electrode assembly 110, which is configured to have a structure in which positive electrodes 112 and negative electrodes 114 are stacked in a state in which separators 113 are interposed respectively between the positive electrodes 112 and the negative electrodes 114, is mounted in a battery case 120 in a state in which the electrode assembly 110 is impregnated with an electrolyte (not shown). Electrode tabs 140 and electrode leads 142 are formed at one side of the battery cell 100.

The battery case 120 includes an upper case 121, which faces the uppermost electrode 115 of the electrode assembly 110, and a lower case 122, which faces the lowermost electrode 116 of the electrode assembly 110. Patterns 150, each of which has a striped structure including a plurality of stripes extending in a lateral direction of the battery case 120 on the basis of the position of the battery case 120 at which the electrode leads 142 are formed, are formed on a case surface of the upper case 121 corresponding to the upper surface of the electrode assembly 110 and on a case surface of the lower case 122 corresponding to the lower surface of the electrode assembly 110.

The shape of the pattern will be described in more detail with reference to FIG. 4. Two typical views A and A' are shown in FIG. 4.

Referring first to typical view A, specifically, a battery case 120 includes an outer coating layer 125 made of a weather-resistant polymer, an inner sealant layer 127 made of a thermally bondable polymer, and a barrier layer 126 interposed between the outer coating layer 125 and the inner sealant layer 127. A pattern 150 includes a plurality of grooves 151 formed at the battery case 120 such that the grooves 151 are concave in a direction in which an electrode assembly 110 is mounted in the battery case 120. The grooves 151 are formed at all of the outer coating layer 125, the barrier layer 126, and the inner sealant layer 127, and are arranged at a predetermined interval G.

Referring to typical view A', on the other hand, specifically, a battery case 120' includes an outer coating layer 125' made of a weather-resistant polymer, an inner sealant layer 127' made of a thermally bondable polymer, and a barrier layer 126' interposed between the outer coating layer 125' and the inner sealant layer 127'. A pattern 150 includes a plurality of grooves 151' formed at the battery case 120' such that the grooves 151' are concave in a direction in which an electrode assembly 110' is mounted in the battery case 120'. The grooves 151' are formed only at the outer coating layer 125' while being arranged at a predetermined interval G' in order to prevent the reduction in sealing force of the battery case 120', the exposure of the barrier layer 126', or the reduction in strength of the barrier layer 126'.

The above structures are different from each other in terms of the depths of the grooves 151 and 151'. In a case in which the grooves 151 are formed at all of the outer coating layer 125, the barrier layer 126, and the inner sealant layer 127, as shown in typical view A, the grooves 151 at the outer coating layer 125, the barrier layer 126, and the inner sealant layer 127 have different depths. In the following description, the depths of the grooves 151 and 151' will be defined as depths d and d' of the grooves 151 and 151' respectively formed at the outer coating layers 125 and 125'.

Referring back to typical view A, in a case in which the grooves 151 are formed at all of the outer coating layer 125, the barrier layer 126, and the inner sealant layer 127, the depth d of the grooves 151 is equivalent to about 50% to 85% of the total thickness of the battery case 120. The grooves 151 have the maximum depth at the outer coating layer 125. The depth of the grooves 151 gradually decreases from the outer coating layer 125 to the inner sealant layer 127. Consequently, the grooves 151 have the minimum depth at the inner sealant layer 127. That is, the depth of the grooves 151 is relatively large. As a result, the grooves 151 affect even the inner sealant layer 127. Even in this case, however, all of the layers 125, 126, and 127 may be deformed in conformity with the shape of the grooves 151.

Unless the depth of the grooves 151 exceeds the above-defined range, the barrier layer 126 is not directly exposed to the outside even though each layer has a thin portion, i.e. a portion having a small thickness. The battery case 120 with the above-stated construction may be easily bent or curved without wrinkles being formed on the battery case 120 even though there is a slight possibility that the sealing force of the battery case will be reduced, the barrier layer will be exposed, or the strength of the barrier layer will be reduced. Consequently, the battery case 120 may be used for a battery cell that will be mounted in a device that is greatly bent or curved.

Referring to typical view A', on the other hand, in a case in which the grooves 151' are formed only at the outer coating layer 125' of the battery case 120', the depth d' of the grooves 151' is equivalent to about 30% of the thickness of the outer coating layer 125'. For example, the depth d' of the grooves 151' may be 10 micrometer or less. That is, the depth of the grooves 151' is relatively small with the result that the grooves 151' do not affect the barrier layer 126' and the inner sealant layer 127'. The battery case 120' with the above-stated construction may not be easily bent or curved since the depth of the grooves 151' is relatively small. However, the battery case 120' exhibits high safety. Consequently, the battery case 120' may be used for a battery cell that is not intended to be easily deformable and is to be mounted in a device in which safety is critical.

FIG. 5 is a typical view showing jigs that are used to manufacture the battery case and an enlarged perspective view showing a concave and convex structure of each of the jigs.

Specifically, a pattern may be formed on the battery case through a forming process of the battery case or through an additional pressing process after the forming process. In this case, deep drawing jigs, which are used in the forming process of the battery case, and/or additional pressing jigs may be used. For the convenience of understanding, FIG. 5 shows an example in which a pattern is formed on a battery case configured to have a structure in which a space for receiving an electrode assembly is formed only at a lower case of the battery case, on the basis of which the following description will be given.

Referring to FIG. 5, a jig 510 for forming a pattern on a lower case 513, which has a space for receiving an electrode assembly, includes an upper jig part 511 and a lower jig part 512 that are configured to correspond to the shape of the lower case 513. The lower jig part 512 has a concave and convex structure 514 for forming a desired pattern on the lower surface of the lower case 513. Also referring to FIG. 4, the concave and convex structure corresponds to the shape of the grooves.

In a case in which the pattern is formed during the forming process, the jig 510 may be a deep drawing jig. In a case in which the pattern is formed during the additional pressing process after the forming process, on the other hand, the jig 510 may be an additional pressing jig.

In the same manner, a jig 520 for forming a pattern on an upper case 523 includes an upper jig part 521 and a lower jig part 522 that are configured to correspond to the shape of the upper case 523. The upper jig part 521 is configured to have a concave and convex structure 524 for forming a desired pattern on the upper surface of the upper case 523.

In a case in which the pattern is formed during the forming process, the jig 520 may be an additional pressing jig, which may be used in a process of forming the upper case such that the upper case corresponds in size to the lower case. In a case in which the pattern is formed during the additional pressing process after the forming process, on the other hand, the jig 510 may be an additional pressing jig for forming the pattern.

Meanwhile, FIGS. 6 to 8 are plan views showing battery cells 200, 300, and 400 having different patterns according to the present invention, respectively.

Referring to FIGS. 6 to 8 together with FIG. 3, patterns 250, 350, and 450 formed on battery cases have a lattice structure, a continuous diamond structure, and a honeycomb structure, respectively. However, the present invention is not limited thereto. The pattern may be set based on a direction in which the electrode assembly is bent or curved.

In a case in which a battery case having the pattern formed thereon is used, it is possible to prevent unintentional wrinkles from being formed on the battery case or to prevent the battery case from being folded even when the battery cell is deformed. Consequently, it is possible to effectively prevent a dielectric breakdown phenomenon or an electrolyte leakage phenomenon due to the exposure of a metal layer caused by damage to the battery case.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery case according to the present invention is configured such that patterns are formed on the surfaces of the battery case facing a bent or curved electrode assembly. In a case in which a battery cell is manufactured using the battery case with the above-stated construction according to the present invention, it is possible to prevent unintentional wrinkles from being formed on the battery case or to prevent the battery case from being folded even when the battery cell is deformed. Consequently, it is possible to effectively prevent a dielectric breakdown phenomenon or an electrolyte leakage phenomenon due to the exposure of a metal layer caused by damage to the battery case, thereby improving the safety of the battery cell.

The invention claimed is:

1. A battery case made of a laminate sheet, comprising:
   an outer coating layer made of a weather-resistant polymer;
   an inner sealant layer made of a thermally bondable polymer; and
   a barrier layer interposed between the outer coating layer and the inner sealant layer,
   wherein a pattern is formed on at least one surface of the battery case,
   wherein the outer coating layer entirely covers the barrier layer,
   wherein the inner sealant layer includes a first surface adjacent the barrier layer and a second surface spaced from and opposite the first surface, the second surface being flat,
   wherein the pattern comprises a plurality of grooves formed at the battery case such that the grooves are concave in a direction in which an electrode assembly is mounted in the battery case,
   wherein the grooves are formed in all of the outer coating layer, the barrier layer, and the inner sealant layer of the battery, and wherein the depth of the grooves gradually decreases from the outer coating layer to the inner sealant layer.

2. The battery case according to claim 1, wherein the pattern has a striped structure, a honeycomb structure, a lattice structure, or a continuous diamond structure when the battery case is viewed from above.

3. The battery case according to claim 1, wherein each of the grooves has a depth equivalent to 30% to 85% of a total thickness of the battery case.

4. The battery case according to claim 1, wherein the grooves are arranged at an interval of 2 mm to 15 mm.

5. The battery case according to claim 1, wherein an area of the surface of the battery case within which the pattern is formed is equivalent to 50 to 100% of an entire area of the surface of the battery case when the battery case is viewed from above.

6. The battery case according to claim 1, wherein the battery case comprises an upper case that faces an upper surface of the electrode assembly and a lower case that faces a lower surface of the electrode assembly, and the pattern is formed on a case surface of the upper case corresponding to the upper surface of the electrode assembly and on a case surface of the lower case corresponding to the lower surface of the electrode assembly.

7. The battery case according to claim 1, wherein the barrier layer is a metal layer made of any one selected from a group consisting of aluminum, iron, copper, tin, nickel, cobalt, silver, stainless steel, and titanium or an alloy thereof.

8. The battery case according to claim 1, wherein the weather-resistant polymer is polyethylene terephthalate (PET), polyethylene naphthalate (PEN), or nylon.

9. The battery case according to claim 1, wherein the thermally bondable polymer is polyolefin.

10. The battery case according to claim 1, wherein the grooves are formed through the entire outer coating layer of the battery case.

11. The battery case according to claim 1, wherein each of the grooves has a depth equivalent to 30% to 70% of a total thickness of the battery case.

12. The battery case according to claim 1, wherein each of the grooves has a depth equivalent to 30% to 50% of a total thickness of the battery case.

13. The battery case according to claim 1, wherein each of the grooves has a depth equivalent to 50% to 85% of a total thickness of the battery case.

14. The battery case according to claim 1, wherein the first surface has a groove pattern.

15. A battery cell comprising:
a battery case according to claim 1;
an electrode assembly configured to be bent or curved in conformity with a shape of a device, in which the battery cell is mounted; and
an electrolyte.

16. A battery pack comprising a battery cell according to claim 15 as a unit cell.

17. A device comprising a battery pack according to claim 16 as a power source.

18. The device according to claim 17. wherein the device is selected from a group consisting of a mobile phone, a portable computer, a smart phone, a smart pad, a tablet PC, a netbook computer, a light electronic vehicle (LEV), an electric vehicle, a hybrid electric vehicle, a plug-in hybrid electric vehicle, and a power storage apparatus.

* * * * *